(12) United States Patent
Kim et al.

(10) Patent No.: US 9,748,539 B2
(45) Date of Patent: Aug. 29, 2017

(54) BATTERY MODULE

(71) Applicant: SAMSUNG SDI CO., LTD., Yongin-si, Gyeonggi-do (KR)

(72) Inventors: Tae-Yong Kim, Yongin-si (KR); Jong-Han Rhee, Yongin-si (KR); Shi-Dong Park, Yongin-si (KR); Jun-Woo Cho, Yongin-si (KR); Seong-Joon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 9 days.

(21) Appl. No.: 14/538,750

(22) Filed: Nov. 11, 2014

(65) Prior Publication Data
US 2015/0140406 A1   May 21, 2015

(30) Foreign Application Priority Data

Nov. 19, 2013 (KR) ......................... 10-2013-0140371

(51) Int. Cl.
*H01M 2/10* (2006.01)
(52) U.S. Cl.
CPC ...... *H01M 2/1077* (2013.01); *H01M 2220/20* (2013.01)
(58) Field of Classification Search
None
See application file for complete search history.

(56) References Cited

U.S. PATENT DOCUMENTS

| 2010/0136461 | A1 | 6/2010 | Tsujiko et al. | |
| 2011/0262799 | A1* | 10/2011 | Kim | H01M 2/1077 429/156 |
| 2012/0040226 | A1* | 2/2012 | Kim | H01M 2/1077 429/120 |
| 2013/0171491 | A1* | 7/2013 | Wei | H01M 2/1077 429/120 |
| 2013/0183571 | A1* | 7/2013 | Miyazaki | H01M 2/1077 429/156 |

(Continued)

FOREIGN PATENT DOCUMENTS

| EP | 2 819 210 A1 | 12/2014 |
| JP | 2010-287550 | 12/2010 |

(Continued)

OTHER PUBLICATIONS

EPO Search Report dated Apr. 20, 2015, for corresponding European Patent application 14193673.2, (5 pages).

*Primary Examiner* — Lucas J. O'Donnell
(74) *Attorney, Agent, or Firm* — Lewis Roca Rothgerber Christie LLP (57) ABSTRACT

A battery module includes a plurality of battery cells, an end plate, and bush members. The plurality of battery cells are arranged along a direction. The end plate is adjacent to an outermost battery cell among the plurality of battery cells. The bush members are at respective sides of the end plate. In the battery module, the end plate includes a first end plate adjacent to the outermost battery cell, the first end plate including a first material, and a second end plate at an outer side of the first end plate, the second end plate including a second material. The bush members are at respective sides of the first and second end plates and between the first and second end plates.

15 Claims, 6 Drawing Sheets

(56) References Cited

U.S. PATENT DOCUMENTS

2015/0004469 A1* 1/2015 Park .................. H01M 2/1077
  429/151
2015/0140408 A1 5/2015 Hayashida et al.

FOREIGN PATENT DOCUMENTS

| JP | 2012-230832 | 11/2012 |
| KR | 10-2007-0025734 | 3/2007 |
| KR | 10-2009-0130328 | 12/2009 |
| WO | WO 2013/179797 A1 | 12/2013 |

* cited by examiner

BATTERY MODULE

CROSS-REFERENCE TO RELATED APPLICATION

This application claims priority to and the benefit of Korean Patent Application No. 10-2013-0140371, filed on Nov. 19, 2013 in the Korean Intellectual Property Office, the content of which is incorporated herein by reference in its entirety.

BACKGROUND

1. Field

Aspects of embodiments of the present invention are directed toward a battery module.

2. Description of the Related Art

In general, battery cells are used as energy sources for mobile devices, electric vehicles, hybrid vehicles, and the like. The shape of the battery cell may be variously changed depending on the kind of external device to which the battery cell is applied.

In a case where long-time driving, long-distance driving, and/or high-power driving are desired in an electric vehicle or hybrid vehicle which consumes a large amount of power, a large-capacity battery module is configured by electrically coupling (e.g., electrically connecting) a plurality of battery cells in order to increase electrical power and capacity. The output voltage or output current of the battery module may be increased according to the number of battery cells included in the battery module.

SUMMARY

Aspects of embodiments of the present invention are directed toward a battery module in which an end plate is formed of a plastic compound material and steel, so that it is possible to increase the strength of the battery module and easily control or vary the thickness of the end plate while reducing the weight of the battery module.

According to an embodiment of the present invention, a battery module includes: a plurality of battery cells arranged along a direction; an end plate adjacent to an outermost battery cell among the plurality of battery cells; and bush members at respective sides of the end plate, wherein the end plate includes a first end plate adjacent to the outermost battery cell, the first end plate including a first material, and a second end plate at an outer side of the first end plate, the second end plate including a second material, and wherein the bush members are at respective sides of the first and second end plates and between the first and second end plates.

The second material may have a hardness greater than a hardness of the first material.

The first material may include a plastic compound, and the second material may include steel.

The second end plate may include a protruding portion protruded toward the first end plate.

The protruding portion may extend from one side toward an other side of the second end plate along a direction parallel to a bottom surface of the second end plate.

The first end plate may include an accommodating portion having a shape corresponding to the protruding portion of the second end plate.

The accommodating portion may include at least one rib contacting the protruding portion.

The at least one rib may include a first rib contacting the second end plate between the protruding portions or at an uppermost or lowermost side of the protruding portion, a second rib contacting a middle region of the protruding portion, and a third rib contacting the protruding portion and extending between the first and second ribs.

The bush member may have a through-hole, and the through-hole may extend in a longitudinal direction along a length of the bush member.

The second end plate may further include extending portions at respective sides of the second end plate, and each extending portion may be bent and extend toward the battery cells, and each of the bush members may be coupled to a respective one of the extending portions.

The second end plate and the bush member may be welded together.

The first end plate may further include mounting portions at respective sides of the first end plate, and each of the bush members may be coupled to a respective one of the mounting portions.

The battery module may further include a side plate at a side of the battery cells, and the side plate may include a fastening hole member under a bottom surface of one of the bush members.

The battery module may further include a top plate at an upper surface of the battery cells, and the top plate may include a fastening hole member over a top surface of one of the bush members.

The top plate and the side plate may be welded together.

According to aspects of embodiments of the present invention, the end plate is formed of a plastic compound material and steel. The portion of the end plate formed of steel increases the strength of the battery module. In addition, the portion of the end plate formed of the plastic compound material allows the thickness of the end plate to be easily varied and reduces the weight of the end plate.

BRIEF DESCRIPTION OF THE DRAWINGS

Example embodiments will now be described more fully hereinafter with reference to the accompanying drawings; however, they may be embodied in different forms, and the present invention should not be construed as limited to the embodiments set forth herein. Rather, these embodiments are provided so that this disclosure will be thorough and complete and will fully convey the scope of the example embodiments to those skilled in the art.

In the figures, dimensions may be exaggerated for clarity of illustration. It will be understood that when an element is referred to as being "between" two elements, it may be the only element between the two elements or one or more intervening elements may also be present. Like reference numerals refer to like elements throughout.

DETAILED DESCRIPTION

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Hereinafter, like reference numerals refer to like elements.

It will be understood that when an element or layer is referred to as being "on," "connected to", or "coupled to" another element or layer, it may be directly on, connected, or coupled to the other element or layer or one or more intervening elements or layers may also be present. When an element is referred to as being "directly on", "directly connected to", or "directly coupled to" another element or layer, there are no intervening elements or layers present. As used herein, the term "and/or" includes any and all combinations of one or more of the associated listed items. Further, the use of "may" when describing embodiments of the present invention relates to "one or more embodiments of the present invention".

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
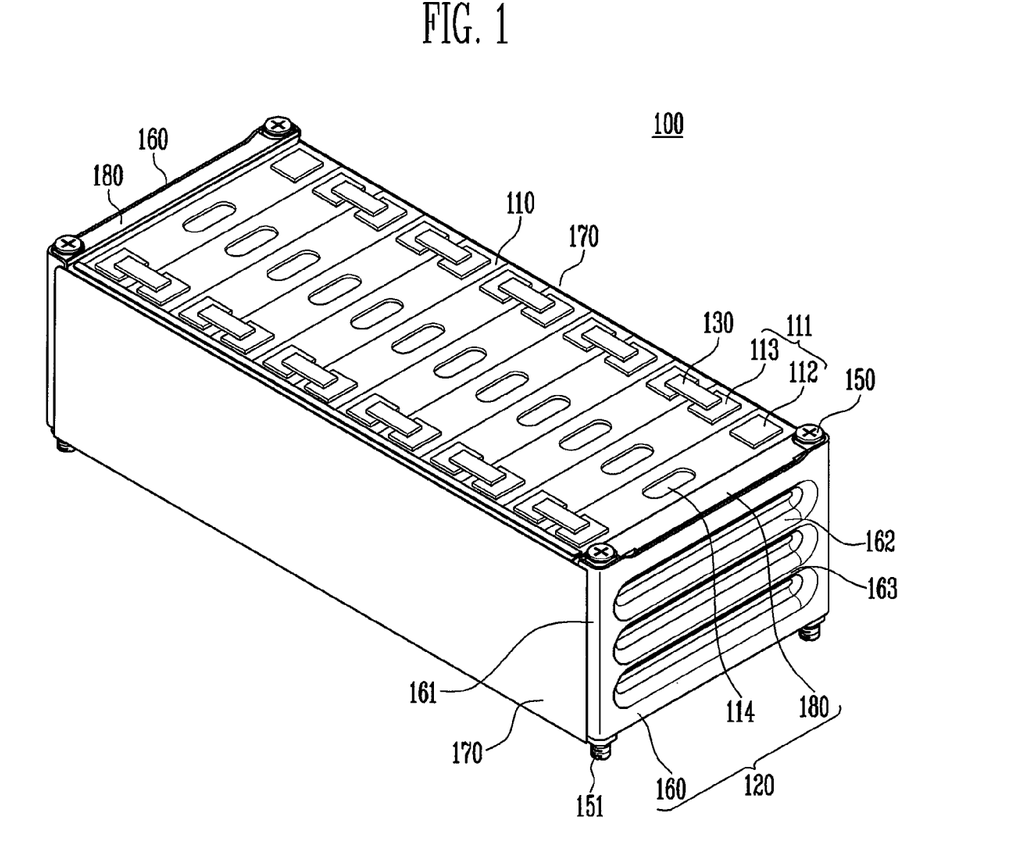
FIG. 1 is a perspective view showing a battery module according to an embodiment of the present invention.
Figure 2:
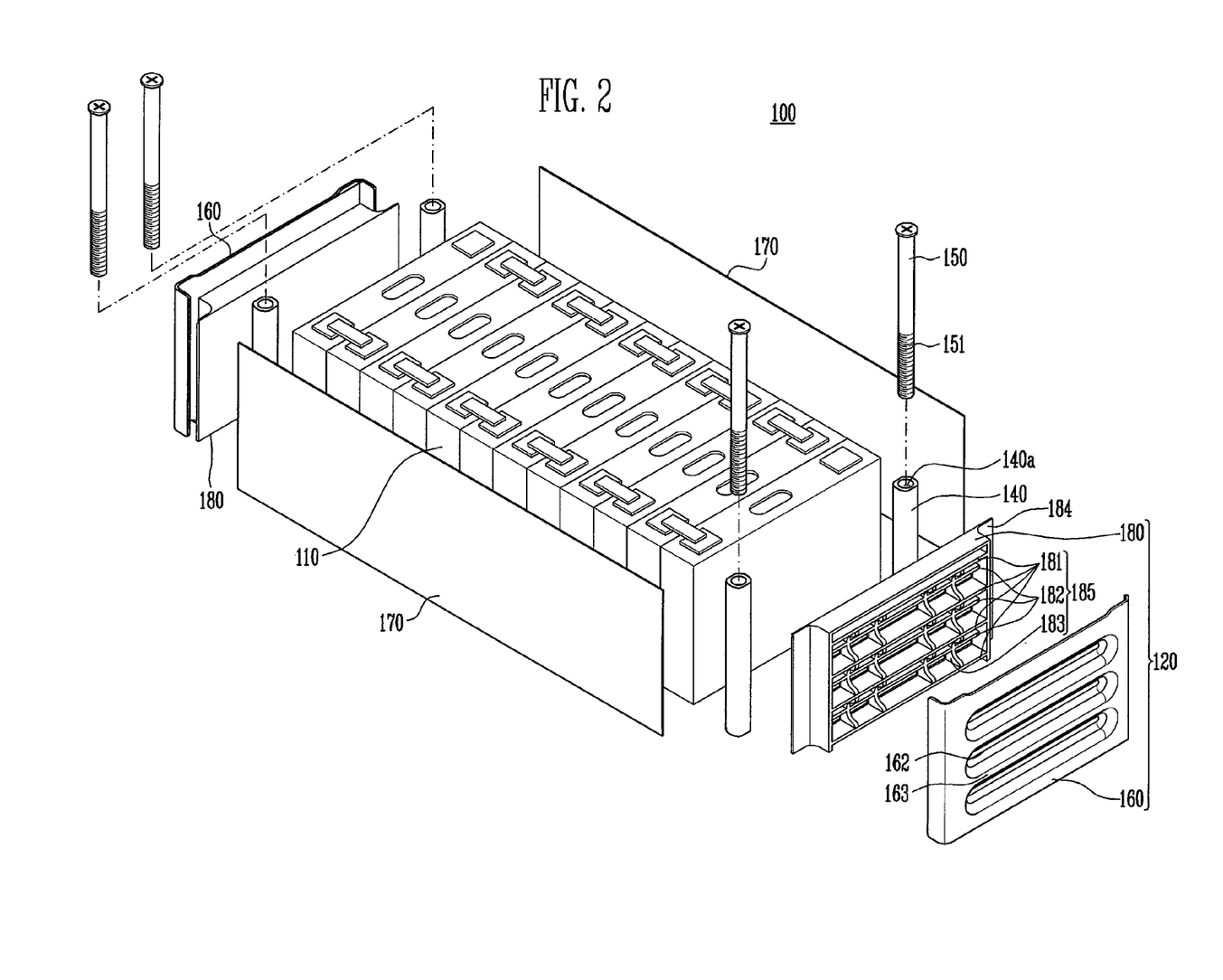
FIG. 2 is an exploded perspective view showing the battery module shown in FIG. 1.

FIG. 1 is a perspective view showing a battery module according to an embodiment of the present invention. FIG. 2 is an exploded perspective view showing the battery module shown in FIG. 1.

Referring to FIGS. 1 and 2, the battery module 100 according to this embodiment includes a plurality of battery cells 110 aligned along one direction (e.g., arranged along one direction) and an end plate 120 positioned adjacent to an outermost battery cell 110 among the plurality of battery cells 110. Bush members 140 are respectively positioned at both sides of the end plate 120.

The end plate 120 includes a first end plate 180 adjacent to the battery cell 110 (e.g., adjacent to the outermost battery cell 110), the first end plate 180 being made of a first material, and a second end plate 160 positioned at an outer side of the first end plate 180 (e.g., the second end plate 160 may be positioned at an outermost side of the battery module 100), the second end plate 160 being made of a second material. The bush members 140 are respectively positioned at both sides of and between the first and second end plates 180 and 160. Here, the second material may be formed of a material having a hardness greater than that of the first material. For example, the first material may include a plastic compound material, and the second material may include steel.

According to this embodiment, the end plate 120 is not formed of one material but is formed of the plastic compound material and steel. Therefore, it is possible to ensure the insulating characteristics (e.g., the electrical insulating characteristics) of the end plate 120 while reducing the weight thereof when the first end plate 180 is formed of the plastic compound material and to increase the strength of the battery module 100 when the second end plate 160 is formed of steel.

In addition, the design of the first end plate 180, made of the plastic compound material, may be easily changed or varied; for example, the thickness of the first end plate 180 may be easily changed or varied as desired. As the thickness of the first end plate 180, made of the plastic compound material, is increased, the strength of the first end plate 180 increases accordingly. A glass fiber may be included in the plastic compound material at a content of about 50 wt %. The glass fiber functions (acts) to complement the hardness of the plastic compound material (that is, the glass fiber may increase the hardness and/or strength of the plastic compound material).

The second end plate 160 includes at least one protruding portion 162 protruded toward the first end plate 180. In this case, the protruding portion 162 may be formed (e.g., continuously formed or extended) from one side to the other side of the second end plate 160 along a direction parallel to a bottom surface of the second end plate 160 (e.g., along a direction perpendicular to the alignment direction of the plurality of battery cells 110). In this embodiment, three protruding portions 162 are formed to be spaced from each other at an interval along a direction perpendicular to the bottom surface of the second end plate 160 (that is, the protruding portions 162 are arranged along the direction perpendicular to the bottom surface of the second end plate 160).

An accommodating portion 185 having a shape corresponding to (e.g., accommodating) the protruding portion 162 of the second end plate 160 is formed at the first end plate 180. The accommodating portion 185 is formed to come in contact with the protruding portion 162. The accommodating portion 185 includes (e.g., is formed in the shape of) at least one rib. Here, the accommodating portion 185 includes a first rib 181 contacting a space or area of the second end plate 160 between the protruding portions 162 thereof or contacting an uppermost or lowermost side of the protruding portion 162, a second rib 182 contacting a middle region of the protruding portion 162, and a third rib 183 contacting the protruding portion 162 while coupling (e.g., connecting or extending between) the first and second ribs 181 and 182.

The second end plate 160 further includes extending portions 161 bent and extended toward the battery cells 110 respectively from both side portions thereof, and the bush members 140 may be respectively coupled to the extending portions 161. The second end plate 160 and bush members 140 may be formed of a metal material, such as steel. The bush members 140 may be coupled to the respective extending portions 161 of the second end plate 160 through, for example, laser welding or ultrasonic welding.

A through-hole 140a is formed in the bush member 140 along a vertical direction with respect to a bottom surface of the bush member 140 (e.g., the through-hole 140a extends in a length direction of the bush member 140), and a fixing member 150 is inserted into the through-hole 140a. The fixing member 150 may be a bolt (e.g., a long bolt), and a screw thread 151 formed at a lower end of the fixing member 150 is fastened in an opening (e.g., a hole) formed in a base portion of a mechanism (e.g., a mounting area), thereby coupling (e.g., fixing) the battery module 100 to the base portion of the mechanism. In addition, mounting portions 184 each having the bush member 140 coupled thereto (e.g., mounted thereon) are respectively formed at both sides of the first end plate 180.

Generally, in a comparative example in which a battery module is fixed to a base portion of a mechanism to which the battery module is mounted, an opening (e.g., a hole) for coupling (e.g., bolting) the battery module to the base portion of the mechanism is formed in a fastening portion extended from an end plate disposed adjacent to an outermost battery cell.

However, the design of the battery module of the comparative example may cause an overdesign of the end plate in order to ensure hardness (or strength) sufficient for the weight and environmental specification of the battery module. In addition, it is highly likely that stress will be concentrated due to a local fixing structure of the battery module.

In a comparative example in which the end plate is made of only steel, an additional insulation film is applied between the end plate and the battery cells so that an electrical insulation structure is between the battery cells and the end plate. In a comparative example in which the end plate is made of only a plastic material, the maximum stress the plastic material can withstand (e.g., the tensile strength of the plastic material) is less than that of steel. Hence, it is difficult to apply the end plate made of only the plastic material to a structure at which the stress is concentrated.

However, the present invention does not provide a structure bolted to a base portion through a fastening portion of the end plate but provides a fixing structure fastened to the base portion through the separate bush member 140 so that the battery module 100 may be strongly and securely fastened to the base portion. In addition, the end plate 120 is made of both the plastic compound material and steel, so that it is possible to ensure sufficient hardness (or strength) of the end plate 120 while reducing the weight of the battery module 100.

The battery module 100 according to this embodiment includes a plurality of battery cells 110 aligned along one direction (e.g., arranged along one direction). In this case, the battery cells 110 are aligned (e.g., arranged) so that wide surfaces of adjacent battery cells 110 face each other.

Each battery cell 110 constituting the battery module 100 may include a battery case of which one surface is open and an electrode assembly and an electrolyte which are accommodated in the battery case. The electrode assembly and the electrolyte generate energy through an electrochemical reaction therebetween, and the battery case may be hermetically sealed at an upper surface (e.g., at the one surface). For example, the upper surface of the battery cell 110 may include a cap assembly. The upper surface of the battery cell 110 is provided with positive and negative electrode terminals 112 and 113 having different polarities and a vent portion 114. The vent portion 114 is a safety mechanism of the battery cell 110, which acts as a passage through which excess gas generated inside the battery cell 110 is exhausted to the outside of the battery cell 110.

A pair of end plates 120 are respectively provided adjacent to outermost battery cells 110, and a pair of side plates 170 coupling (e.g., connecting or extending between) the pair of end plates 120 are respectively disposed at sides of the battery cells 110. The plurality of battery cells 110 are aligned along, (e.g., arranged along) the one direction within a space defined by the pair of end plates 120 and the pair of side plates 170.

In this case, the plurality of battery cells 110 are aligned (e.g., arranged) in parallel so that their respective wide surfaces face each other. Thus, the positive and negative electrode terminals 112 and 113 of two adjacent battery cells 110 may be electrically coupled (e.g., electrically connected) through a bus-bar 130. The bus-bar 130 may be made of an electrically conductive metal, such as gold, silver, copper, nickel, aluminum, a copper alloy, and/or an aluminum alloy in order to couple (e.g., connect) terminal portions 111 (that is, to respectively couple positive and negative terminals 112 and 113 of adjacent battery cells 110). The bus-bar 130 may be bonded to the terminal portions 111 through, for example, welding. In one embodiment, the welding may be laser welding or ultrasonic welding. The shape of the bus-bar 130 may be variously modified according to the shape of the terminal portions 111 (e.g., according to the size and/or location of the positive and negative terminals 112 and 113).

Although it has been described in this embodiment that the battery cells 110 are each a square lithium ion secondary battery, the present invention is not limited thereto, and various types of batteries, such as a lithium polymer battery, may be included.

Figure 3:
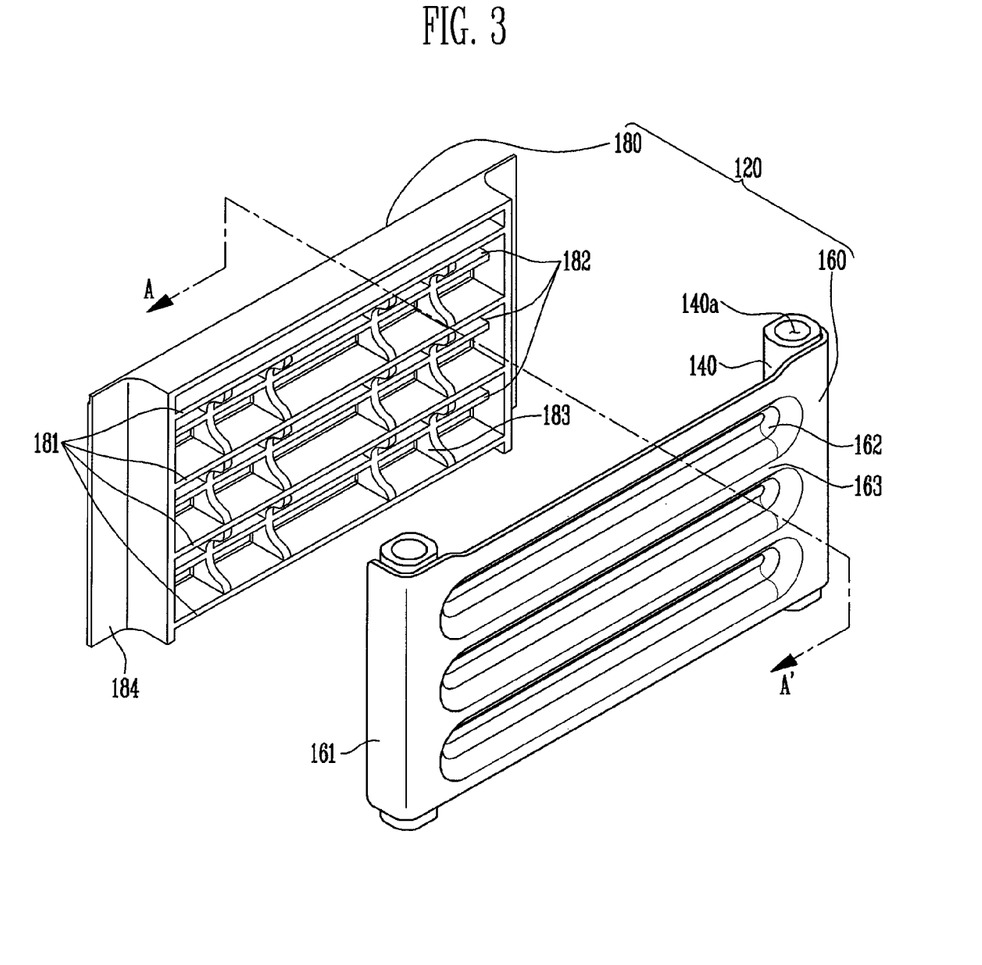
FIG. 3 is an exploded perspective view showing an end plate and a bush member according to an embodiment of the present invention.
Figure 4:
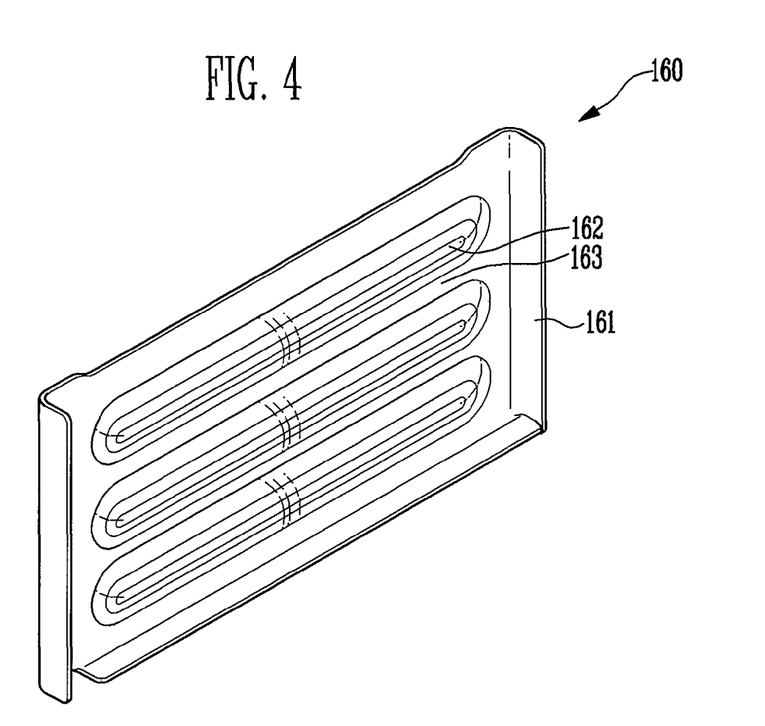
FIG. 4 is a perspective view showing an inner surface of a first end plate shown in FIG. 3.

FIG. 3 is an exploded perspective view showing an end plate and a bush member according to an embodiment of the present invention. FIG. 4 is a perspective view showing an inner surface of a first end plate shown in FIG. 3. Hereinafter, the first end plate, the second end plate, and the bush member according to this embodiment will be described with reference to FIGS. 3 and 4. Here, components identical or corresponding to those of FIGS. 1 and 2 are designated by like reference numerals, and their detailed descriptions may be omitted to avoid redundancy.

Referring to FIGS. 3 and 4, the first end plate 180, made of a plastic compound material, and the second end plate 160, made of steel, are formed so that their opposite surfaces (e.g., their surfaces that face each other) correspond to each other.

The second end plate 160 may include at least one protruding portion 162 protruded toward the first end plate 180 along a direction perpendicular to a bottom surface of the second end plate 160. In this case, the protruding portion 162 may be formed (e.g., continuously formed) from one side to the other side of the second end plate 160 (e.g., the protruding portion 162 may extend from one side of the second end plate 160 to the other side thereof along a direction parallel to the bottom surface of the second end plate 160). An accommodating portion 185 having a shape corresponding to (e.g., accommodating) the protruding portion 162 of the second end plate 160 is formed at the first end plate 180.

Here, the accommodating portion 185 includes (e.g., is formed in the shape of) at least one rib contacting the protruding portion 162. The accommodating portion 185 includes a first rib 181, a second rib 182, and a third rib 183. The first rib 181 contacts a space of the second end plate 120 between the protruding portions 162 or an uppermost or lowermost side of the protruding portion 162. The second rib 182 contacts a middle region of the protruding portion 162. The third rib 183 contacts the protruding portion 162 while coupling (e.g., connecting or extending between) the first and second ribs 181 and 182. That is, the second rib 182 that contacts the middle region of the protruding portion 162 may be formed to be shorter than the first rib 181 that contacts the space between the protruding portions 162.

As such, the protruding portion 162 is formed at the second end plate 160, and the accommodating portion 185 accommodating the protruding portion 162 is formed at the first end plate 180 so that the first and second end plates 180 and 160 may be coupled closely to each other.

The bush member 140 has the through-hole 140a formed therein, and the through-hole 140a is formed along the vertical direction with respect to a bottom surface thereof. The bush member 140 is coupled to the second end plate 160 through, for example, welding. The second end plate 160 may further include extending portions 161 bent and extended toward the battery cells 110 respectively from both side portions thereof, and the bush member 140 is coupled to the extending portion 161. In addition, mounting portions 184 each having the bush member 140 mounted thereon may be respectively formed at both sides of the first end plate 180.

The first end plate 180 is configured to come in contact (e.g., surface contact) with the outermost battery cell 110 and to pressurize the plurality of battery cells 110 (e.g., to compress the plurality of battery cells 110). Accordingly, it is possible to prevent or reduce a swelling phenomenon that occurs in the battery cells 110. In a case of a general or comparative battery module, battery cells are pressurized using only one end plate at each end of the battery module. In this case, the thickness of the end plate is thin, and hence, the pressurization (i.e., compression) of the battery cells may be limited. However, in embodiments of the present invention, the first end plate 180 made of the plastic compound material is provided so that the thickness of a portion pressurizing (e.g., compressing) the battery cells 110 may be increased, thereby allowing increased pressurization (i.e., further compression) of the battery cells 110.

Unlike the second end plate 160, which is made of steel, the first end plate 180 is formed of a relatively lightweight material, such as the plastic compound material, so that it is possible to prevent or reduce an increase in the weight of the battery module 100.

Figure 5:
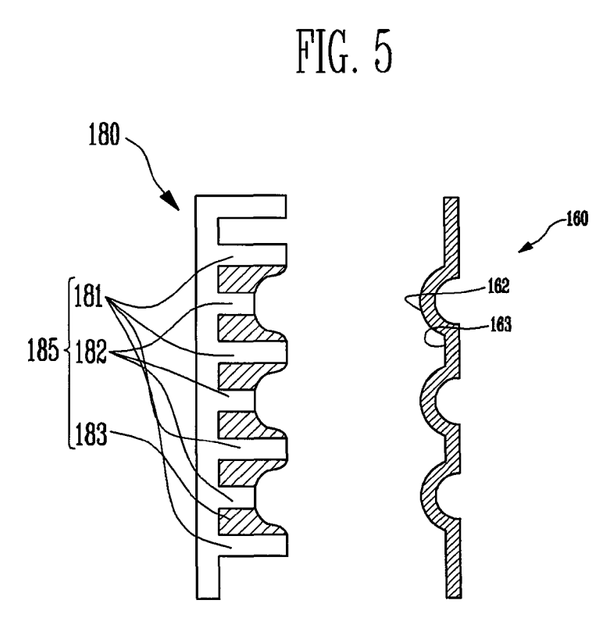
FIG. 5 is a sectional view taken along a line A-A' of FIG. 3.

FIG. 5 is a sectional view taken along a line A-A' of FIG. 3.

Referring to FIG. 5, at least one protruding portion 162 of the second end plate 160 is protruded toward the first end plate 180, and spaces 163 between the protruding portions 162 are spaced from each other at an interval and have a flat shape. An accommodating portion 185 having a shape corresponding to (e.g., accommodating) the protruding portion 162 is formed at the first end plate 180 opposite to (e.g., facing) the second plate 160. The accommodating portion 185 of the first end plate 180 includes (e.g., is formed in the shape of) at least one rib contacting the protruding portion 162.

Here, the accommodating portion 185 includes ribs having different lengths and shapes corresponding to the protruding portion 162. That is, the ribs include a first rib 181, a second rib 182, and a third rib 183. The first rib 181 contacts the space 163 between the protruding portions 162 or an uppermost or lowermost side of the protruding portion 162. The second rib 182 contacts a middle region of the protruding portion 162. The third rib 183 contacts the protruding portion 162 while coupling (e.g., connecting or extending between) the first and second ribs 181 and 182.

Accordingly, the second rib 182 that contacts the middle region of the protruding portion 162 may be formed shorter than the first rib 181 that contacts the space 163 between the protruding portions 162 or the uppermost or lowermost side of the protruding portion 162. The third rib 183 is formed corresponding to the shape of the protruding portion 162 and extends between the first and second ribs 181 and 182. Thus, a vertical cross-section of the accommodating portion 185 including the first, second, and third ribs 181, 182, and 183 may be formed to correspond to the protruding portion 162.

Figure 6:
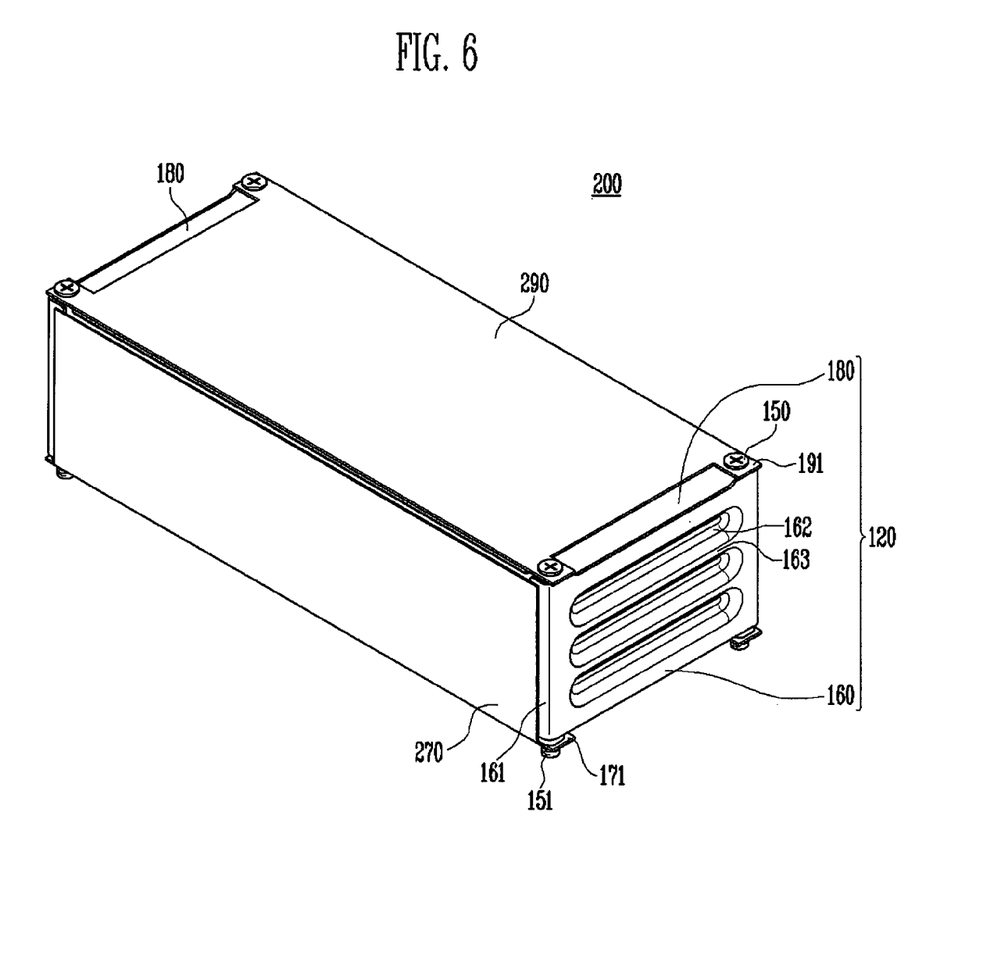
FIG. 6 is a perspective view showing a battery module according to another embodiment of the present invention.
Figure 7:
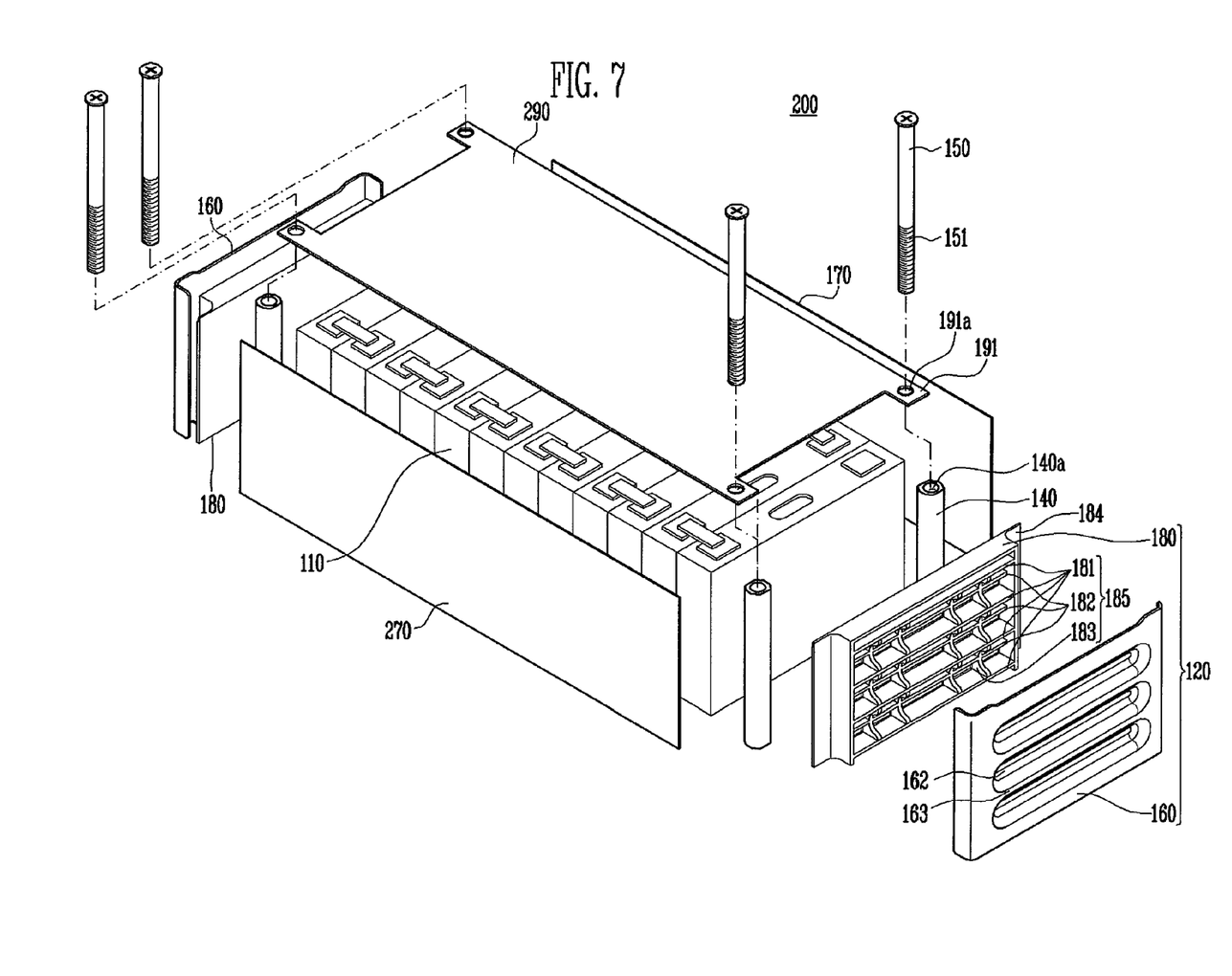
FIG. 7 is an exploded perspective view showing the battery module shown in FIG. 6.

FIG. 6 is a perspective view showing a battery module according to another embodiment of the present invention. FIG. 7 is an exploded perspective view showing the battery module shown in FIG. 6. In this embodiment, components identical or corresponding to those of the aforementioned embodiment shown are designated by like reference numerals, and their detailed descriptions may be omitted to avoid redundancy.

Referring to FIGS. 6 and 7, a side plate 270 disposed at a side of the battery cells 110 may include a first fastening hole member 171 formed to extend to or under a bottom end of the bush member 140. The first fastening hole member 171 has a first fastening hole 171a. The fixing member 150 is inserted into the through-hole 140a formed in the bush member 140 and the first fastening hole 171a to allow the side plate 270 and the bush member 140 to be coupled together (e.g., fastened together). Accordingly, the side plate 270 and the end plate 120 may be more strongly coupled to each other.

A battery module 200 according to this embodiment may include a top plate 290 configured to cover a top of the battery cells 110. In one embodiment, the top plate 290 may cover an upper surface of the battery cells 110 (e.g., a surface of the battery cells 110 from which the terminal portion 111 extends). Accordingly, it is possible to prevent the bus-bar 130 from being short-circuited with (e.g., contacting) an external conductor. The top plate 290 may be coupled to the side plate 270 through, for example, ultrasonic welding or laser welding.

The top plate 290 may include a second fastening hole portion 191 formed to extend to or over a top end of the bush member 140. The second fastening hole portion 191 has a second fastening hole 191a formed therein. The fixing member 150 is inserted into the through-hole 140a formed in the bush member 140 and the second fastening hole 191 to allow the top plate 290 and the bush member 140 to be fastened together. Accordingly, the top plate 290 and the end plate 120 may be more strongly coupled to each other.

As described above, according to the present invention, the separate bush members 140 for fixing the battery module are provided, thereby more stably fixing the battery module. The bush members 140 are respectively coupled to both sides of each of the pair of second end plates 160 made of steel, so that external impacts applied to the battery module 100 may be equally distributed to the second end plates 160. Accordingly, it is possible to prevent an impact from being concentrated at only a portion of the second end plates 160. In addition, the second end plate 180 made of the plastic compound material is positioned between the outermost battery cell 110 and the second end plate 160 so that it is possible to reduce the weight of the battery module and to easily control or vary the thickness of the end plate 120.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A battery module, comprising:
   a plurality of battery cells arranged along a direction;
   an end plate adjacent to an outermost battery cell among the plurality of battery cells; and
   bush members at respective sides of the end plate,
   wherein the end plate comprises a first end plate to directly contacting the outermost battery cell, the first end plate comprising a first material, and a second end plate directly contacting the first end plate, the second end plate comprising a second material and defining an end of the battery module, and
   wherein the bush members are between and directly contact both the first and second end plates.

2. The battery module of claim 1, wherein the second material has a hardness greater than a hardness of the first material.

3. The battery module of claim 1, wherein the first material comprises a plastic compound, and the second material comprises steel.

4. The battery module of claim 1, wherein the second end plate comprises a protruding portion protruded toward the first end plate.

5. The battery module of claim 4, wherein the protruding portion extends from one side toward an other side of the second end plate along a direction parallel to a bottom surface of the second end plate.

6. The battery module of claim 4, wherein the first end plate comprises an accommodating portion having a shape corresponding to the protruding portion of the second end plate.

7. The battery module of claim 6, wherein the accommodating portion comprises at least one rib contacting the protruding portion.

8. The battery module of claim 7, wherein the at least one rib comprises a first rib contacting the second end plate between the protruding portions or at an uppermost or lowermost side of the protruding portion, a second rib contacting a middle region of the protruding portion, and a third rib contacting the protruding portion and extending between the first and second ribs.

9. The battery module of claim 1, wherein the bush member has a through-hole, and the through-hole extends in a longitudinal direction along a length of the bush member.

10. The battery module of claim 1, wherein the second end plate further comprises extending portions at respective sides of the second end plate, wherein each extending portion is bent and extends toward the battery cells, and wherein each of the bush members is coupled to a respective one of the extending portions.

11. The battery module of claim 10, wherein the second end plate and the bush member are welded together.

12. The battery module of claim 1, wherein the first end plate further comprises mounting portions at respective sides of the first end plate, and wherein each of the bush members is coupled to a respective one of the mounting portions.

13. The battery module of claim 1, further comprising a side plate at a side of the battery cells,
   wherein the side plate comprises a fastening hole portion under a bottom surface of one of the bush members.

14. The battery module of claim 13, further comprising a top plate at an upper surface of the battery cells,
   wherein the top plate comprises a fastening hole portion over a top surface of one of the bush members.

15. The battery module of claim 14, wherein the top plate and the side plate are welded together.

* * * * *